United States Patent
Pearson et al.

(10) Patent No.: US 11,046,496 B2
(45) Date of Patent: Jun. 29, 2021

(54) PROTECTIVE DEVICE FOR ELECTRONIC DEVICE

(71) Applicant: Hewlett-Packard Development Company, L.P., Spring, TX (US)

(72) Inventors: Tom E. Pearson, Vancouver, WA (US); Michael W. Hu, Vancouver, WA (US); Shawn Richard Piper, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 31 days.

(21) Appl. No.: 16/333,305

(22) PCT Filed: Oct. 12, 2016

(86) PCT No.: PCT/US2016/056535
§ 371 (c)(1),
(2) Date: Mar. 14, 2019

(87) PCT Pub. No.: WO2018/071009
PCT Pub. Date: Apr. 19, 2018

(65) Prior Publication Data
US 2019/0241341 A1   Aug. 8, 2019

(51) Int. Cl.
*B65D 81/02* (2006.01)
*H02J 7/00* (2006.01)
(Continued)

(52) U.S. Cl.
CPC .......... *B65D 81/02* (2013.01); *B32B 38/0004* (2013.01); *G04G 19/00* (2013.01);
(Continued)

(58) Field of Classification Search
CPC .......... B32B 2307/412; B32B 2571/00; B32B 38/0004; B65D 81/02; H02J 7/00; H02J 7/0042
(Continued)

(56) References Cited

U.S. PATENT DOCUMENTS 9,016,935 B2    4/2015   Kaltenrieder et al.
2008/0264535 A1* 10/2008  Yu ........................ B29C 45/16
                                                   150/165

(Continued)

FOREIGN PATENT DOCUMENTS

CN       103513563 A      1/2014
RU          128604 U1     5/2013
WO    WO-2003039860 A1    5/2003

OTHER PUBLICATIONS

"Moto 360", Motorola Mobility LLC, 2015 < https://motorola-global-en-roe.custhelp.com/ci/fattach/get/1264664/1434744581/redirect/1/session/L2F2LzEvdGltZS8xNDY5NjgyNjUwL3NpZC9vWUdUa0RXbQ==/filename/Moto360_UG_en-GB_68017733005B.pdf > N/A N/A N/A Moto 360.

(Continued)

*Primary Examiner* — Rafael A Ortiz
(74) *Attorney, Agent, or Firm* — Fabian VanCott

(57) ABSTRACT

A protective device includes: a cling film sized and shaped to protect a surface of an electronic device, the protected surface of the electronic device comprising contacts for charging a battery of the electronic device; and a conductive pathway through the cling film corresponding to the contacts on the electronic device for charging the battery of the electronic device.

19 Claims, 10 Drawing Sheets

(51) Int. Cl.
  *B32B 38/00*   (2006.01)
  *G04G 19/00*   (2006.01)
(52) U.S. Cl.
  CPC .............. *H02J 7/00* (2013.01); *H02J 7/0042* (2013.01); *B32B 2307/412* (2013.01); *B32B 2571/00* (2013.01)
(58) Field of Classification Search
  USPC .................... 206/320; 455/575.8; 229/87.02; 361/225, 679.01, 679.02, 679.21, 679.26, 361/679.3
  See application file for complete search history.

(56) References Cited

U.S. PATENT DOCUMENTS

| | | |
|---|---|---|
| 2014/0177399 A1 | 6/2014 | Teng et al. |
| 2015/0091764 A1 | 4/2015 | Hsieh et al. |
| 2015/0349375 A1* | 12/2015 | Takahashi .............. H01G 9/048 429/7 |
| 2017/0094039 A1* | 3/2017 | Lu ........................... B32B 27/08 |

OTHER PUBLICATIONS

Guns and Gadgets, "Apple Watch Not Charging?! Easy Fix!!", Youtube, 2015 < https://www.youtube.com/watch?v=BQTJN8Hydw0 >.

MrWGT, "Plastic Film on Backside?", XDA Developers Forum, Feb. 9, 2016, < http://forum.xda-developers.com/moto-360-2015/help/plastic-film-backside-t3311787 >.

* cited by examiner

PROTECTIVE DEVICE FOR ELECTRONIC DEVICE

BACKGROUND

Many electronic devices have surfaces that the manufacturer and vendor will want to protect from scratches or other damage prior to sale. This may include a display portion of the electronic device or a polished portion of the housing or casing. Consequently, packaging is often designed to protect such surfaces from damage during shipping, storage and prior to purchase by the end user.

BRIEF DESCRIPTION OF THE DRAWINGS

The accompanying drawings illustrate various implementations of the principles described herein and are a part of the specification. The illustrated implementations are merely examples and do not limit the scope of the claims.

Throughout the drawings, identical reference numbers designate similar, but not necessarily identical, elements.

DETAILED DESCRIPTION

Figure 1:
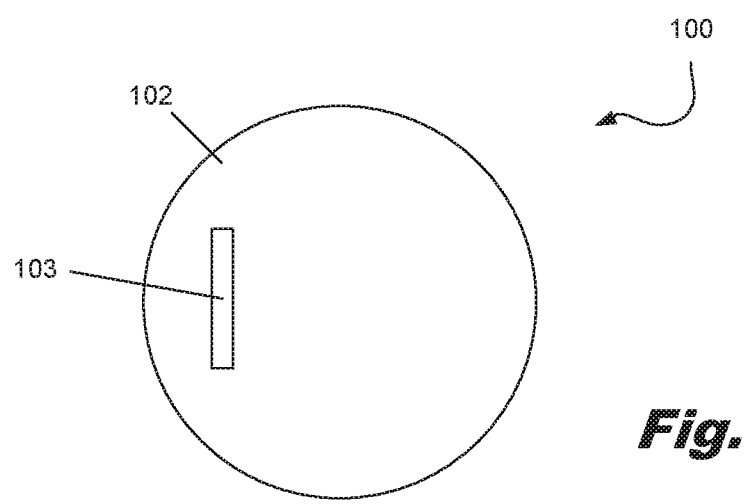
FIG. 1 is an illustration of an example protective device consistent with the disclosed implementations.

As noted above, many electronic devices have surfaces that the manufacturer and vendor will want to protect from scratches or other damage prior to sale. This may include a display portion of the electronic device or a polished portion of the housing or casing. Consequently, packaging is often designed to protect such surfaces from damage during shipping, storage and prior to purchase by the end user.

Specifically, a protective covering or wrap may be placed over a surface that it is particularly desired should be protected. This covering may be a transparent cling wrap that enables a potential purchaser to see and appreciate the finish or the function of the protected part of the device. However, any scratching or other damage that might occur will be absorbed by the protective covering rather than the underlying surface.

When the device is then purchased and readied for use, the user can simply peal the protective covering away from the device and discard it. The protected surface should then be in pristine condition when the purchaser begins using the device.

In many cases, an electronic device is not charged or is placed in an extremely low power state during shipping and storage while awaiting purchase. Consequently, the user may have to charge the new device before it can be used. This will frequently mean placing the device in, or connected the device to, a charger that will charge the internal battery of the electronic device.

Many electronic devices have external contacts or pads that correspond to matching contacts in a charger. When the device is placed in its charger, physical and electrical contact is made between the contacts on the device and in the charger so that the charger can deliver electrical power to the device to charge the internal battery.

In some cases, the charging contacts on the electronic device may be on a surface that is covered by a protecting covering at the time of purchase. The presumption is that the user will remove this covering prior to connecting the electronic device to the charger. This, however, may not be the case. The user may fail to remove the protective covering, perhaps because the protective covering was not noticed by the user or the user simply forgot to remove the protective covering.

In any such case, the protective covering may then interfere with the electrical contact between the device and the corresponding charger. Specifically, if the protective covering remains over the electrical contacts on the electronic device when the electronic device is placed in the charger, physical contact between the electrical contacts on the electronic device and the corresponding contacts of the charger will be prevented. As a result, the charger may be unable to deliver power to and charge the electronic device.

When the user notes that the electronic device is not charging, the user may incorrectly assume that the device is defective. This may result in a frustrating and costly call to a customer support technician or returning the product to the point of sale only to be reminded to remove the protective covering.

Consequently, in one example, the present specification describes a protective device that includes: a cling film sized and shaped to protect a surface of an electronic device, the protected surface of the electronic device comprising contacts for charging a battery of the electronic device; and a conductive pathway through the cling film corresponding to the contacts on the electronic device for charging the battery of the electronic device.

In another example, the present specification describes a method of making a protective device by: providing a cling film; and forming a conductive pathway through the cling film.

In another example, the present specification describes an electronic device with a removable protective device that includes: the electronic device; a removable cling film disposed protectively on a surface of the electronic device, the protected surface of the electronic device comprising contacts for charging a battery of the electronic device; and a conductive pathway through the cling film corresponding to the contacts on the electronic device for charging the battery of the electronic device.

As used herein and in the following claims, the term "cling film" refers to a flexible film used to protectively cover a surface of an electronic device. The cling film may be a polymer film. The cling film may use electrostatics or static electricity to cling releasably to a surface where it is installed. Alternatively, the cling film may be coated with an adhesive that does not set over time and allows the film to be readily pealed from the protected surface when desired. In some examples, the cling film may be transparent to permit a full view of the underlying surface being protected.

As used herein and in the following claims, the term "non-sticky adhesive film" refers to a film that does not form chemical bonds of adhesion with an adjacent surface, but which is adhesive due to, as noted above, static electrical properties or a non-setting adhesive.

As used herein and in the following claims, the term "electronic device" refers to any electronic device that incorporates a battery needing to be periodically charged. Examples of an electronic device including a smartphone and a smartwatch.

As used herein and in the following claims, the term "conductive pathway" refers to a path capable of conducting electrical energy or current. Specifically, a conductive pathway permits the transfer of electrical energy from a charger to an electronic device being charged. A conductive pathway, or a "conductor" as used herein, may be include metal or other conductive materials.

As used herein and in the following claims, the term "smartwatch" refers to any wearable electronic device having an internal battery that is periodically charged using a charger.

FIG. 1 is an illustration of an example protective device consistent with the disclosed implementations. As shown in FIG. 1, the protective (100) device includes: a cling film (102) sized and shaped to protect a surface of an electronic device, the protected surface of the electronic device comprising contacts for charging a battery of the electronic device; and a conductive pathway (103) through the cling film corresponding to the contacts on the electronic device for charging the battery of the electronic device.

As noted above, the cling film (102) may be a non-sticky adhesive film, which is a film that does not form chemical bonds of adhesion with an adjacent surface, but which is adhesive due to, for example, static electrical properties or a non-setting adhesive. The cling film (102) may be transparent.

The conductive pathway (103) may be formed by a conductor or conductive material installed in a hole through the cling film (102). This will permit electrical contact through the cling film (102) as explained herein. The conductive pathway (103) may take any of a variety of shapes and configurations and may include multiple isolated pathways to permit a completed electrical circuit, as needed for charging.

Figure 2:
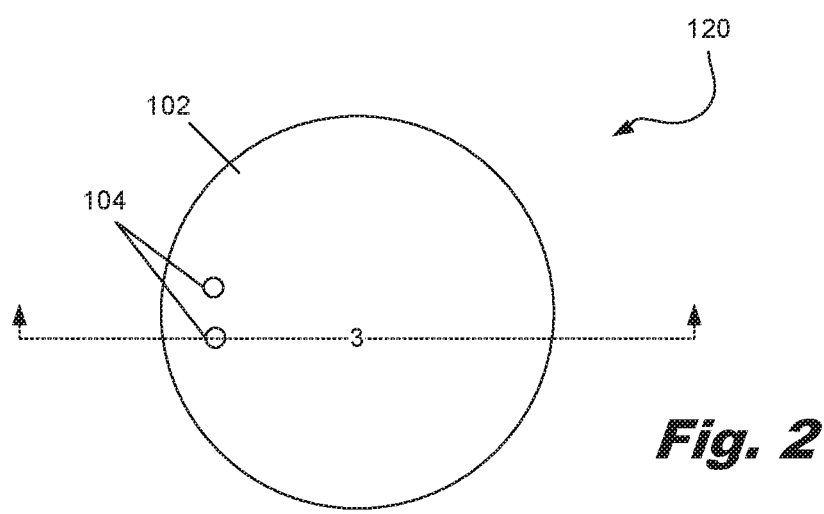
FIG. 2 is another illustration of an example protective device consistent with the disclosed implementations.

FIG. 2 is another illustration of an example protective device consistent with the disclosed implementations. As shown in FIG. 2, the conductive pathway consists of two electrically isolated pathways (104) through the cling film (102). In the context of charging a battery of an electronic device, the two pathways (104) become positive and negative poles for charging the device on which the cling film (102) is installed.

Figure 3:
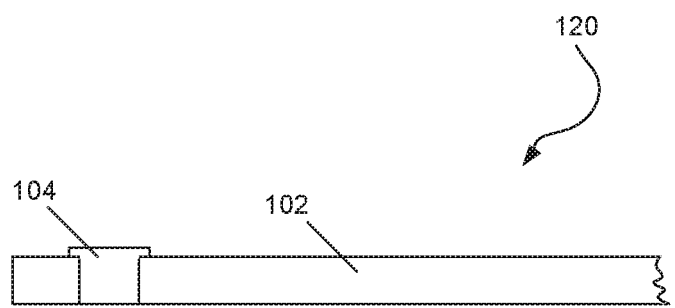
FIG. 3 is a cross-sectional view of the protective device of claim 2 consistent with the disclosed implementations.

Dashed line (3) indicates the perspective of a cross-sectional view of the protective device (120) that is shown in FIG. 3.

FIG. 3 is a cross-sectional view of the protective device of claim 2 consistent with the disclosed implementations. As shown in FIG. 3, the protective device (120) includes the cling film (102) and two conductive pathways (104), one of which is shown in the view of FIG. 3.

The conductive pathway (104) extends through the width or thickness of the cling film (102) and presents an electrical contact point on both sides of the film (102). One side of the conductive pathway (104) may be enlarged, as shown at the top of FIG. 3; to facilitate contact with a corresponding contact in a charger. In this example, the lower surface of the cling wrap (102), as shown in FIG. 3, would be adjacent to the protected surface of an electronic device on which the protective device (120) might be installed.

Figure 4A:
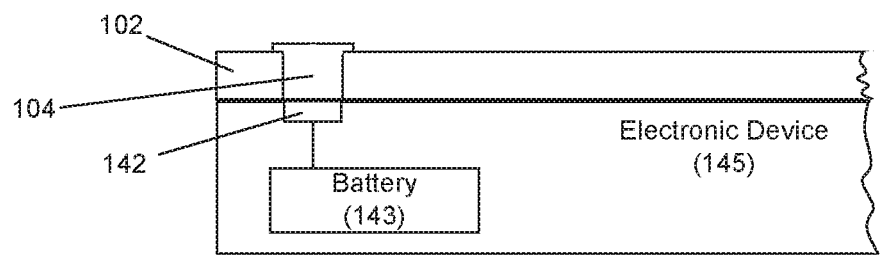
FIG. 4A is an illustration of an example electronic device with a protective device in place thereon consistent with the disclosed implementations.

FIG. 4A is an illustration of an example electronic device with a protective device in place thereon consistent with the disclosed implementations. As shown in FIG. 4A, the electronic device with a removable protective device that includes: the electronic device (145); a removable cling film (102) disposed protectively on a surface of the electronic device (145), the protected surface of the electronic device comprising contacts (142) for charging a battery (143) of the electronic device (145); and a conductive pathway (104) through the cling film (102) corresponding to the contacts (142) on the electronic device (145) for charging the battery (143) of the electronic device (145).

Figure 4B:
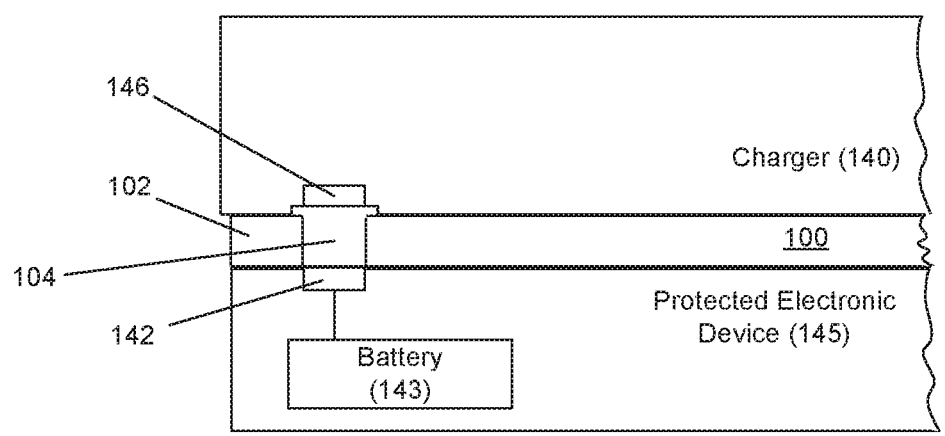
FIG. 4B is an illustration of an example electronic device with a protective device in place thereon placed in a charger consistent with the disclosed implementations.

FIG. 4B is an illustration of an example electronic device with a protective device in place thereon placed in a charger consistent with the disclosed implementations. As shown in FIG. 4B, the protected electronic device (145) has been installed in or connected to a charger (140).

The charger (140) has electrical contacts (146) that correspond to the electrical contacts (142) of the protected electronic device (145). The protective device (100) including the cling film (102) remains on the protected electronic device (145) and is disposed between the protected electronic device (145) and the charger (140).

Nevertheless, the electrical pathway (104) through the cling film (102) provides for an electrical connection between the charger (140) and the protected electronic device (145). Specifically, the electrical pathway (104) has contact points on both sides of the cling film (104) that make contact, respectively, with the electrical contact (146) of the charger (140) and the electrical contact (142) of the protected electronic device (145). In this way, the charger (140) is not impeded from delivering electrical energy to the protected electronic device (145) to charge the battery (143).

Only one contact on the charger and protected electronic device is shown in the cross-sectional view of FIG. 4B. However, it will be understood, as shown elsewhere, that there would be at least two contacts on each of the charger (140) and electronic device (145) to provide positive and negative poles for charging the battery (143) of the electronic device (145) with the charger (140).

Figure 5:
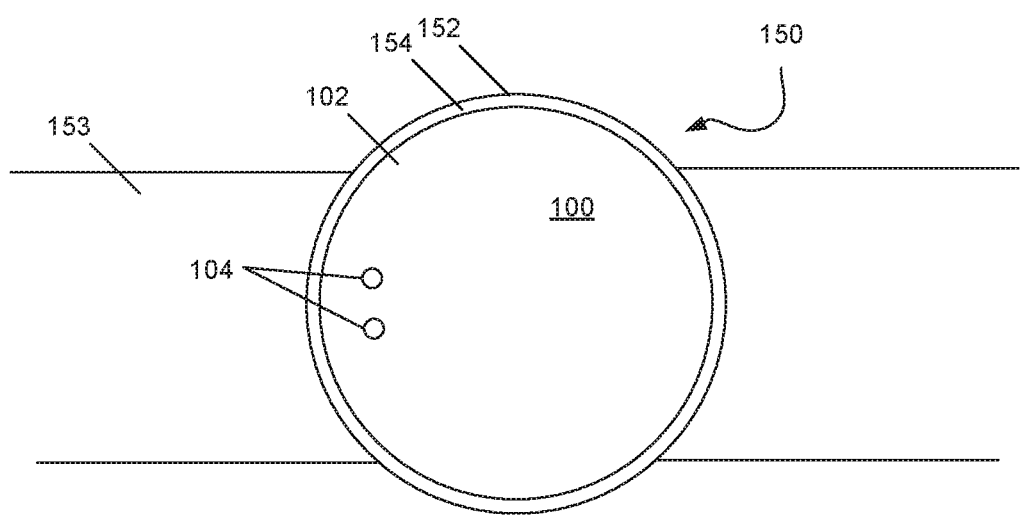
FIG. 5 is an illustration of an example smartwatch with a protective device in place thereon consistent with the disclosed implementations.

FIG. 5 is an illustration of an example smartwatch with a protective device in place thereon consistent with the disclosed implementations. As noted above, a smartwatch is to any wearable electronic device having an internal battery that is periodically charged using a charger.

In various examples, a smartwatch may be an electronic device worn on a user's wrist, like a wristwatch. However, the smartwatch may include a wide range of functionality. In more specific examples, the smartwatch may interface wirelessly with a user's smartphone and provide an interface for the smartphone. In such an example, the smartwatch may include a speaker, microphone, and touch-sensitive display device. Consequently, the user may operate the smartwatch to make or take telephone calls, retrieve information, access the Internet, operate an application or perform any other operation that could be performed directly with the smartphone.

As shown in FIG. 5, a smartwatch (150) may include a watch body (152) and a wristband (153). A protective device (100), as described herein, is installed on a surface (154) of a smartwatch (150). This surface (154) of the smartwatch (150) also includes electrical contacts for charging the smartwatch (150) in a charger. Consequently, as describe herein, the projective device (100) includes a cling film (102) in which are embedded two electrical pathways (104). Consequently, if the smartwatch (150) is inadvertently installed in a charger with the protective device (100) still in place, the charger will still be able to charge the smartwatch (150) using the electrical pathways (104) that correspond to the electrical contacts of the smartwatch.

Figure 6:
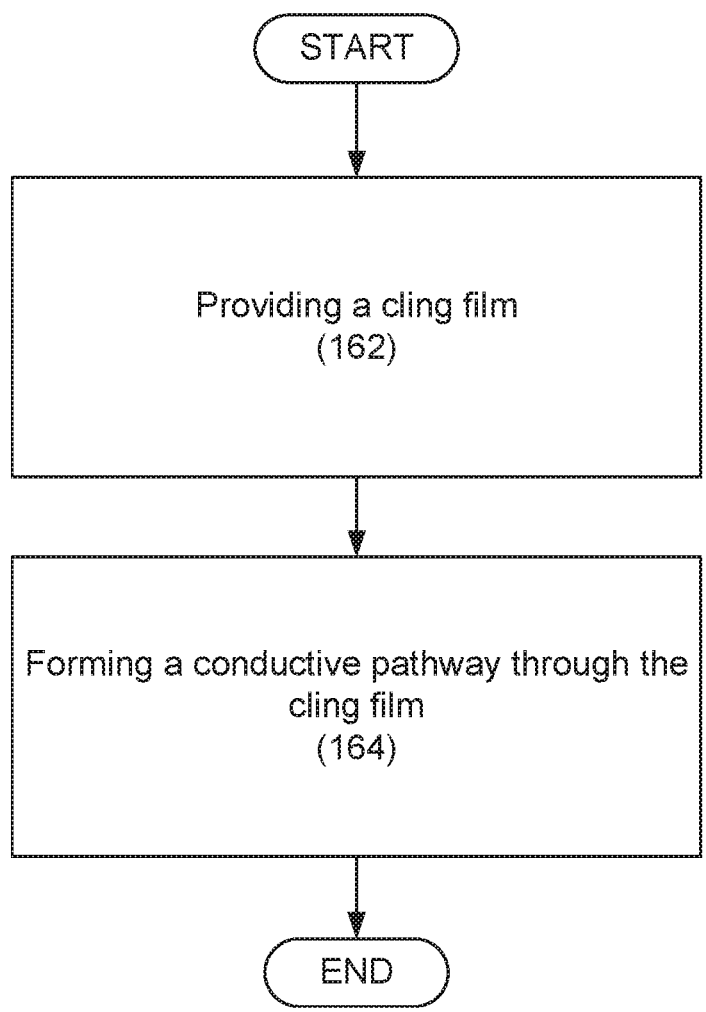
FIG. 6 is a flowchart of an example method of making a protective device consistent with the disclosed implementations.

FIG. 6 is a flowchart of an example method of making a protective device consistent with the disclosed implementations. As shown in FIG. 6, the method of making a protective device includes: providing (162) a cling film; and forming (164) a conductive pathway through the cling film.

Figure 7A:
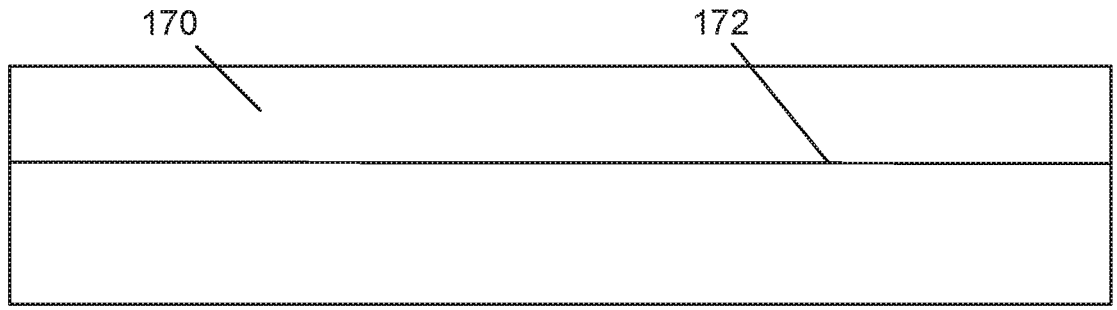
FIGS. 7A-D illustrate steps in an example method of making a protective device consistent with the disclosed implementations.

FIGS. 7A-D illustrate steps in an example method of making a protective device consistent with the disclosed implementations. As shown in FIG. 7A, a roll or strip of cling film (170) is produced. A red stripe (172) may be included through the cling film (170) to make the cling film more visible to a user and less likely to be inadvertently left in place when charging a protected electronic device.

Figure 7B:
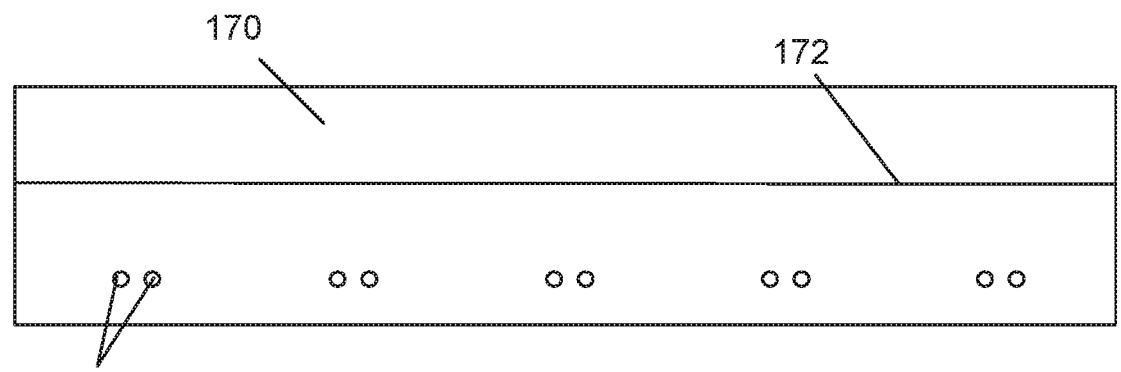

In FIG. 7B, pairs of holes (174) are cut along the strip of cling film (170). These holes (174) may be die cut in the film, for example, with a rotary die cutter. Moreover, these holes (174) will correspond in size and spacing to the electrical contacts on an electronic device to be protected.

Figure 7C:
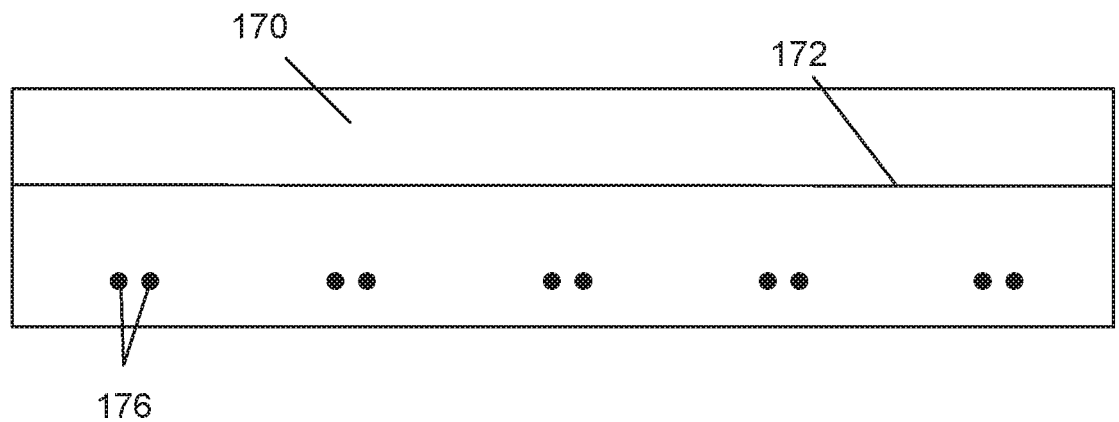

In FIG. 7C, the holes are filled with a conductor or conductive material (176). The conductor (176) may be particulate metal in a binder or other conductive composition. As will be described below, it may be thermally transferred or printed into the holes of the cling film (170).

Figure 7D:
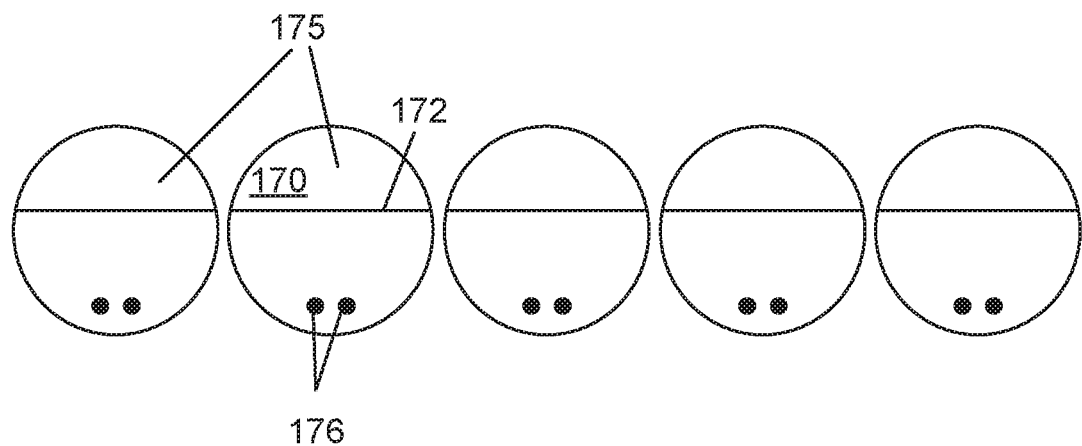

Lastly, as shown in FIG. 7D, individual protective device (175) are cut from the roll of cling film shown in earlier figures. These protective devices (175) can then be installed over surfaces of electronic devices to be protected.

Figure 8:
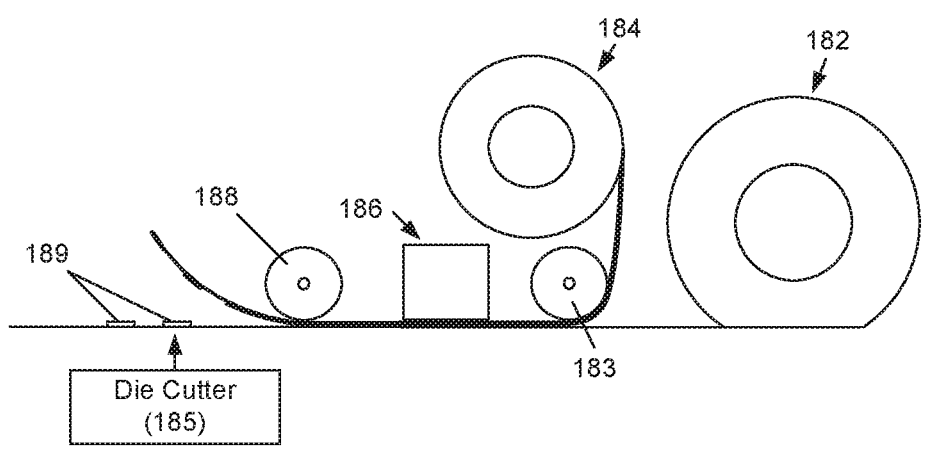
FIG. 8 illustrates an example system and method for making a protective device consistent with the disclosed implementations.

FIG. 8 illustrates an example system and method for making a protective device consistent with the disclosed implementations. As shown in FIG. 8, a roll of cling film (182) is unwound. At a first roller (183), the cling film (182) is matched to a ribbon roll (184) bearing conductive thermal ink.

The paired rolls are then passed by a thermal print head (186). The thermal print head heats localized portions of the conductive thermal ink on the ribbon roll (184) to transfer and fuse to the cling film (182) conductive pads (189). A second roller (188) guides the two rolls, which are then separated.

A die cutter (185), which may be a rotary or other type of die cutter, will pierce the cling film (182) so that the conductive pads (189) can provide an electrical pathway through the film, as described herein. The roll of cling film (182) can then be cut into individual protective devices as described herein.

In an alternative, the die cutter (185) may be placed upstream of the thermal print head (186) so as to make holes in the cling film (182) prior to deposition of the conductive pads (189) formed with conductive thermal ink. This approach would be consistent with the method illustrated in FIGS. 7A-7D.

In addition to avoiding a user perception of a defective product, the subject matter described herein also allows a manufacturer or vendor to test and perform failure analysis on a protected electronic device without having to remove and possibly reapply the non-sticky adhesive protective device described herein. The electrical pathway of the protective device described herein may provide for a data bearing connection to the protected electronic device as well as a connection for battery charging.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A protective device comprising:
a cling film sized and shaped to protect a surface of an electronic device, the protected surface of the electronic device comprising contacts for charging a battery of the electronic device; and
a conductive pathway through the cling film corresponding to the contacts on the electronic device for charging the battery of the electronic device, wherein the conductive pathway comprises a hole through the cling film from a first side of the cling film to a second side of the cling film, the hole being filed with a conductor.

2. The protective device of claim 1, wherein the conductive pathway comprises two conductive pathways extending through a width of the cling film and corresponding to two charging contacts on the electronic device so as to provide a conductive pathway between a charger and the battery of the electronic device with the cling film in place on the protected surface of the electronic device.

3. The protective device of claim 1, wherein the electronic device is a smartwatch, and the cling film is sized and shaped to protect a surface of the smartwatch.

4. The protective device of claim 1, wherein the cling film is a removable film that is disposable when removed from the electronic device.

5. The protective device of claim 1, wherein the conductor has a portion on the first side of the cling film that is wider than the hole in the cling film.

6. A method of making the protective device of claim 1, the method comprising:
providing a cling film; and
forming a conductive pathway through the cling film.

7. The method of claim 6, wherein forming the conductive pathway further comprises:
cutting holes through the cling film; and
filing the holes with a conductor.

8. The method of claim 7, wherein cutting the holes is performed with a rotary die that cuts holes corresponding to charging contacts on a surface of an electronic device.

9. The method of claim 7, wherein filing the holes with a conductor comprises thermal transfer printing using a thermal transfer ribbon containing a conductive material.

10. The method of claim 9, wherein the conductive material comprises particulate conductive metal material and a binder.

11. The method of claim 6, further comprising cutting the cling film to a size and shape corresponding to a surface of an electronic device to be protected by the protective device, the conductive pathway corresponding to charging contacts on that surface of the electronic device.

12. The method of claim 6, further comprising providing a red stripe across the cling film to render the cling film more visible.

13. The method of claim 6, further comprising:
in a roll of cling film, cutting a series of holes, each pair of holes corresponding in size and spacing to charging contacts on a surface of an electronic device;

with a thermal ink ribbon having a conductive ink comprising particulate metal in a binder, successively filing the pairs of holes with conductive material; and cutting the roll of cling film to form a plurality of individual protective devices, each protective device comprising a piece of cling film comprising a pair of holes filed with conductive material to form a conductive pathway through the piece of cling film.

14. An electronic device comprising the removable protective device of claim 1, comprising:

the electronic device;

the cling film being a removable cling film and disposed protectively on a surface of the electronic device, the protected surface of the electronic device comprising contacts for charging a battery of the electronic device; and the conductive pathway through the cling film connecting with contacts on the electronic device for charging the battery of the electronic device.

15. The electronic device of claim 14, wherein the conductive pathway comprises two conductive pathways extending through a width of the cling film and corresponding to two charging contacts on the electronic device so as to provide positive and negative conductive pathways between a charger and the battery of the electronic device with the cling film in place on the protected surface of the electronic device.

16. The electronic device of claim 14, wherein the cling film is a transparent, non-sticky adhesive film that is disposable when removed from the electronic device.

17. A protective device comprising:

a cling film sized and shaped to protect a surface of an electronic device, the protected surface of the electronic device comprising contacts for charging a battery of the electronic device; and a conductive pathway through the cling film corresponding to the contacts on the electronic device for charging the battery of the electronic device;

wherein the conductive pathway comprises two separate conductive pathways through a thickness of the cling film, the two separate conductive pathways being spaced apart on the cling film.

18. A protective device comprising:

a cling film sized and shaped to protect a surface of an electronic device; and two conductive pathways through the cling film, the pathways each comprising a hole through the cling film that is filed with a conductor such that the conductive pathways extend from a first side of the cling film to an opposite second side of the cling film.

19. The protective device of claim 18, wherein the two conductive pathways are positioned in the cling film corresponding to contacts on the electronic device that is underneath the cling film when the cling film is in position on the surface of the electronic device for charging a battery of the electronic device without removing the protective device.

* * * * *